UNITED STATES PATENT OFFICE.

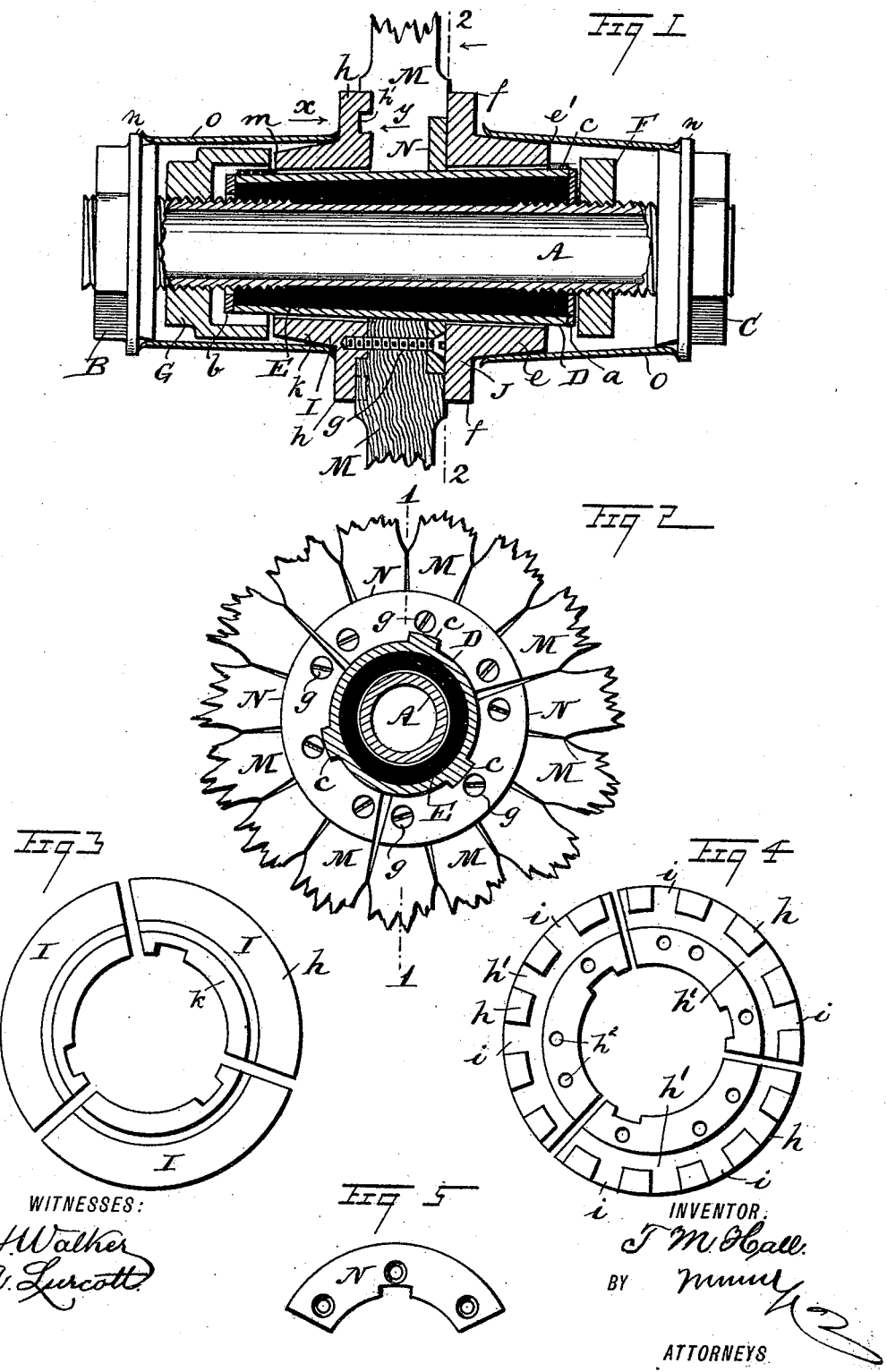

THADEUS M. HALL, OF GRANADA, ASSIGNOR OF ONE-HALF TO L. WIRT MARKHAM AND THOMAS H. CECIL, BOTH OF LAMAR, COLORADO.

WHEEL-HUB.

SPECIFICATION forming part of Letters Patent No. 438,921, dated October 21, 1890.

Application filed July 22, 1890. Serial No. 359,508. (No model.)

*To all whom it may concern:*

Be it known that I, THADEUS M. HALL, of Granada, in the county of Prowers and State of Colorado, have invented a new and useful Vehicle-Wheel Hub, of which the following is a full, clear, and exact description.

This invention relates to improvements in metallic composite vehicle-wheel hubs, and has for its objects to provide a wheel-hub of the type indicated which will readily receive and firmly hold the spokes of the wheel properly spaced apart and afford a certain degree of elasticity to the wheel upon the spindle.

To these ends my invention consists in certain features of construction and combinations of parts, as is hereinafter described, and pointed out in the claims.

Reference is to be had to the accompanying drawings, forming a part of this specification, in which similar letters of reference indicate corresponding parts in all the figures.

Figure 1 is a longitudinal axial section of the wheel-hub, taken on the line 1 1 in Fig. 2. Fig. 2 is a cross-section of the hub on the line 2 2 in Fig. 1. Fig. 3 is a detached side view of a series of clamping-sections which are a part of the composite hub, viewed in the direction of the arrow $x$ in Fig. 1. Fig. 4 is a detached view of the same parts shown in Fig. 3, viewed from the opposite side or in the direction of the arrow $y$ in Fig. 1; and Fig. 5 is a side view of one of a set of binding-plates used to secure the spokes in place.

An elongated metal spindle-box A is provided, which is of a length sufficient to extend beyond the hub proper and receive the nuts B and C on its threaded end portions, which nuts will be further mentioned and their use explained.

A conically-tapered sleeve D is mounted on the spindle-box A, the relative diameter of which is such as to afford space between the box and sleeve for the complete introduction of a tubular packing-joint E, that is made of compact slightly-elastic vulcanized gum or other suitable material, which joint is formed to fit closely within the annular and tapering channel between the sleeve D and box A, so as to retain the first-named concentric with the box, as represented in Fig. 1. The length of the sleeve D and tubular packing-joint E is contracted sufficiently to afford room upon the threaded end portions of the box A for the washers $a$ $b$ and nuts F G. Washer $a$ is placed on the box A in contact with the end of the sleeve D, which has the largest diameter, and in contact with this washer the binding-nut F is secured. On the opposite end portion of the box A the washer $b$ is located adjacent to the sleeve end, there being sufficient space on the threaded body of the box A between the nut B and washer $b$ for the reception of a cupped nut G.

The conical sleeve D has three evenly-spaced longitudinally-extending ribs $c$ formed on its exterior surface, which ribs are adapted to hold the spoke-clamping sections I and J from revoluble movement, these sections being seated respectively on the sleeve near its outer and inner ends, a proper space intervening for the insertion of the spokes M. There are preferably three sections employed in each set of clamps I and J. The latter named, being located toward the inner end of the sleeve D, consist each of a metal block formed by the junction substantially at a right angle and integrally of a base-flange $e$, that is laterally curved to intimately engage the outer surface of the sleeve on which the sections rest, the upper face of these base-flanges being tapered toward the free edge $e'$ and longitudinally grooved on their lower sides to engage the ribs $c$ of the sleeve D. The upright flanges $f$ of the coupling-sections J are radially extended from the base-flanges $e$, and are given a suitable height to engage the tenon ends of the spokes M, there being a series of similar binding-plates N embedded in the spokes to render their outer faces flush with the edge portions of the spoke-tenons that are engaged by the flanges $f$ of the sections J, so that a level bearing is had between these engaged parts.

When the spokes M are to be assembled, as represented in Fig. 2, a sufficient number of screw-bolts $g$ are inserted through lateral perforations in the plates N and their continuations in the spoke-tenons to retain said spokes connected at their tenons and radially diverging. Preferably the bolts are inserted in alternate spokes, the intervening spokes being held in place temporarily by frictional contact with the bolted spoke-tenons.

The clamping-sections I are the same in number as the clamping-sections J, being oppositely located to pair with them, and, as shown in Fig. 4, their radial flanges $h$ of the sections I are grooved at $h'$ concentrically with regard to their peripheral edges, and at an equal distance from the same radial equally-spaced channels $i$ are produced for the introduction of the spokes M, which are shaped on their edges to embed within the groove $h'$, while the ends of the spokes rest upon the sleeve D, as shown in Fig. 1. The screw-bolts $g$ are inserted in tapped holes $h^2$, formed in the radial flanges $h$, and when properly adjusted draw the clamping-sections I J toward each other, so as to bind the spokes M on their outer and inner faces. The base portions $k$ of the clamping-sections I are formed the same as the base-flanges $e$ on the clamping-sections J, their free edges $m$ being forwardly projected to receive the impinging pressure of the cupped nut G.

Upon the outer surfaces of the base-flanges $e$ and $k$ of the clamping-sections J I the hub-shells O are adapted to bear with their inner edges, the outer edge portions of said shells being seated on reduced peripheral edge portions of the nuts B C, these nuts having radial flanges $n$ formed on them for an abutment upon the edges of the cylindrical hub-shells O.

When the parts are assembled as represented in Fig. 1, an adjustment of the nuts B C to force them toward the spokes M will bind the clamping-sections I and J upon the conical sleeve D. In order to evenly expand the diameter of the wheel and secure the spokes M in the wheel-fellies after the tire is set on them, the outer nut B is screwed upon the spindle-box A, so as to cause the inner edge of the hub-shell to press on the radial flanges $h$, the cupped nut G having first been properly set to force the spokes endwise by sliding the clamping-sections toward the large end of the sleeve D.

From the support afforded to the spokes M by the clamping-sections I and J it is evident that the proper "dish" given to the wheel when made will remain unchanged, and, further, that by the introduction of a slightly-yielding joint E between the conical sleeve D and spindle-box A injurious percussion is absorbed and noise obviated in a large degree.

Having thus described my invention, I claim as new and desire to secure by Letters Patent—

1. A wheel-hub comprising the spindle-box A, threaded at both ends and provided with nuts F G thereon, the conical flanged sleeve D, extending from one threaded end of the box to the other and held in place by said nuts, the packing E between said box and sleeve, and the spoke-holding clamps on the outer side of the sleeve D, substantially as described.

2. In a hub, the combination, with the conical sleeve D, provided with external longitudinal ribs $c$, of the spoke-clamping segments I J, fitting upon said sleeve and having grooves receiving the said ribs $c$, the flanges $h$ of the segments I, having grooves $h'$ on their inner faces to receive ribs on the spokes, the segmental binding-plates $n$, connecting groups of spokes flush with the faces thereof, their attaching-bolts $g$ passing into apertures in the segment I, and means for holding the clamping-segments on the sleeve D, substantially as described.

3. The combination, with a spindle-box, a conical slightly-elastic tubular packing-joint on the box, and a conical sleeve on the joint, of a nut to hold the sleeve endwise from displacement, clamping-sections on the sleeve in two series that face toward each other, spokes between the clamping-sections, and means to hold the clamping-sections on the sleeve and press them against the spokes, substantially as set forth.

4. The combination, with a spindle-box having nuts on its end portions, a conical sleeve, and a tubular slightly-elastic packing-joint between the box and sleeve, of radial spokes which rest on the sleeve, two series of clamping-sections held on the sleeve which are adapted to clamp the spokes between them, and two hub-shells that envelop tapering base-flanges of the clamping-sections and that are longitudinally moved by the nuts on the spindle-box ends, substantially as set forth.

5. The combination, with a spindle-box threaded on each end portion, a nut on each end of the spindle-box, a conical sleeve held concentric on the spindle-box by the insertion of a tapering joint, and a tapering tubular elastic packing-joint, of a binding-nut on the spindle that sustains the large end of the sleeve, two series of clamping-sections which are seated oppositely on the sleeve and adapted to clamp spokes between them, a cupped nut on the spindle at the small end of the sleeve, and two hub-shells which bear on the clamping-sections and are moved by the nuts on the spindle-box ends, substantially as set forth.

6. The combination, with a spindle-box threaded on each end portion, a nut on each end of the spindle-box, a conical sleeve held concentric on the spindle-box by the insertion of a tapering joint, and a tapering tubular elastic packing-joint, of a binding-nut on the spindle that sustains the large end of the sleeve, two series of clamping-sections, which are seated oppositely on the sleeve and adapted to clamp spokes between them, a cupped nut on the spindle at the small end of the sleeve, binding-plates which retain the spokes assembled, transverse screw-bolts which pass through the binding-plates and into one series of clamping-sections, and two hub-shells which bear on the clamping-sections and are moved by the nuts on the spindle-box ends, substantially as set forth.

THADEUS M. HALL.

Witnesses:
WILLIAM A. MERRILL,
GEORGE B. BARNES.